H. K. SANDELL.
MEANS FOR RECTIFYING ALTERNATING CURRENT FOR EDISON THREE-WIRE DISTRIBUTION SYSTEM.
APPLICATION FILED APR. 8, 1916.
1,223,000.
Patented Apr. 17, 1917.
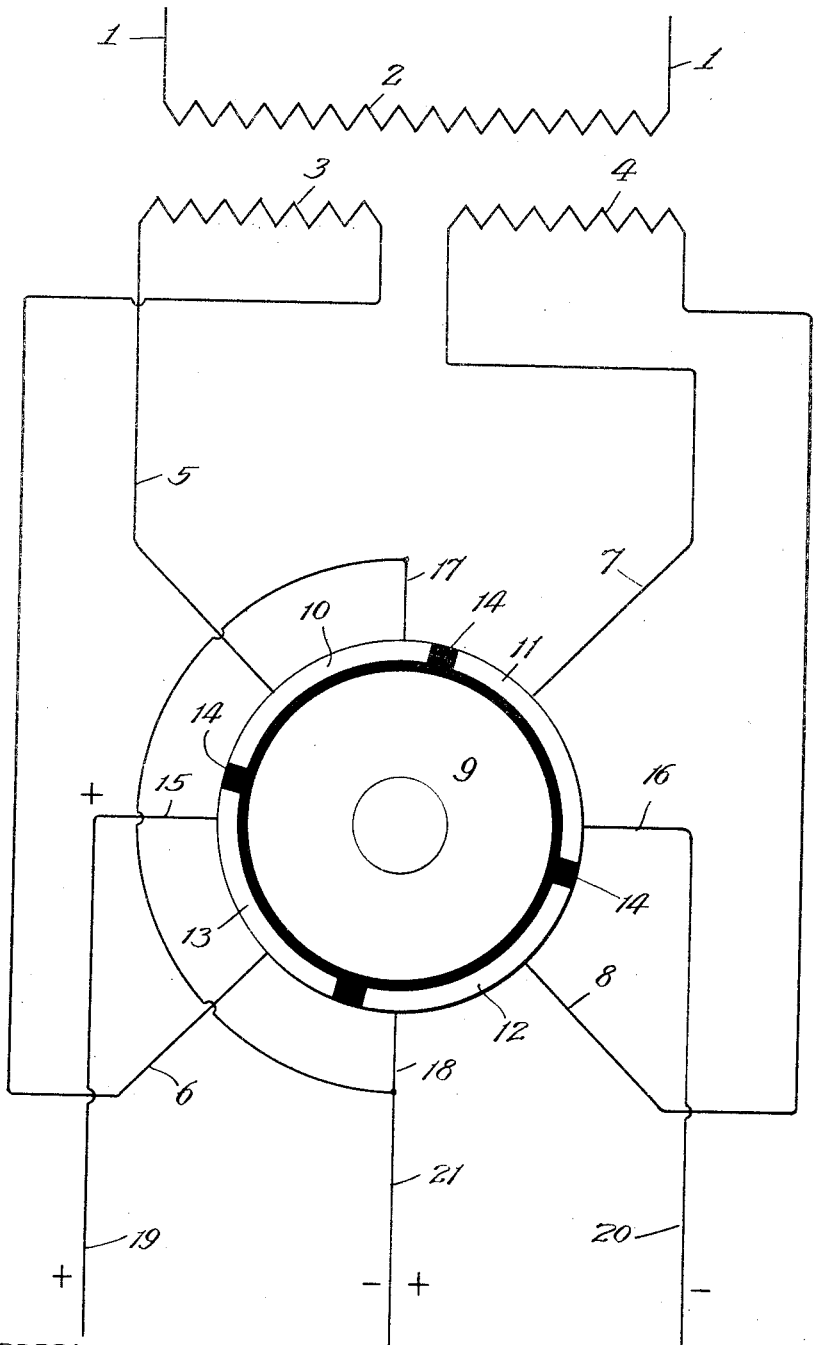

UNITED STATES PATENT OFFICE.

HENRY K. SANDELL, OF CHICAGO, ILLINOIS, ASSIGNOR TO HERBERT S. MILLS, OF CHICAGO, ILLINOIS.

MEANS FOR RECTIFYING ALTERNATING CURRENT FOR EDISON THREE-WIRE DISTRIBUTION SYSTEM.

1,223,000.  Specification of Letters Patent.  Patented Apr. 17, 1917.

Application filed April 8, 1916. Serial No. 89,811.

*To all whom it may concern:*

Be it known that I, HENRY K. SANDELL, a citizen of the United States, residing at 221 South Green street, Chicago, in the county of Cook and State of Illinois, have invented a new and useful Means for Rectifying Alternating Current for Edison Three-Wire Distribution System, of which the following is a specification.

My invention relates to improvements in the art of rectifying alternating currents. More particularly I am at present concerned with a means for rectifying single-phase alternating current for feeding Edison three-wire direct current distribution lines. In general this result is accomplished by the use of a rotary rectifier comprising a synchronous motor which drives a rectifying commutator. The invention will be more fully understood from the following detailed description, taken in connection with the accompanying drawing which illustrates diagrammatically the electrical connections and operation of one form of my invention.

Referring more particularly to the drawing, the numeral 1 designates the two wires of a single-phase alternating current circuit. Between these wires is interposed the primary winding 2 of a transformer and operatively related to this primary winding are two secondary windings 3 and 4. The secondary winding 3 has leads 5 and 6 connected therewith and the secondary winding 4 has leads 7 and 8, all of which leads carry at their terminals brushes indicated diagrammatically and adapted to contact with the surface of a commutator 9, which is driven from a synchronous motor (not shown) in step with the alternating current in the line 1. The commutator 9 is provided with four conductor segments 10, 11, 12 and 13, each extending over somewhat less than 90° of the periphery of the commutator, the sections being insulated from one another and from the commutator body as by the insulation 14. As shown on the drawings the leads 5 and 6 from the transformer winding 3 are connected with brushes set 90° apart upon the commutator, and the leads 7 and 8 from the transformer winding 4 are connected with a second set of brushes, also spaced 90° apart with reference to each other and 90° away from the brushes of the leads 5 and 6 respectively.

For taking off direct current for feeding a three-wire system, I provide four brushes designated 15, 16, 17 and 18, arranged at 90° with relation to one another, and at 45° with relation to the alternating current brushes 5, 6, 7 and 8. The brushes 15 and 16 which are arranged in diametrically opposite positions as shown are connected respectively to the positive and negative direct current leads 19 and 20, while the brushes 17 and 18 which are also diametrically opposite one another, are both connected to the single neutral line 21.

By the action of the rectifying device shown, in combination with the split secondary winding of the transformer, an alternating current supplied by the two line wires 1 is rectified in a proper manner for supplying the three-wires 19, 20 and 21 of an Edison three-wire distribution system. In general, this result follows from the fact that by the connections shown, the two secondary windings 3 and 4 are cross-connected by the commutator in such a fashion as to obtain the desired results. Thus with the commutator in the position shown in the drawing, leads 6 and 7 from the inner ends of the transformer coils 3 and 4 feed respectively the positive and negative direct current line wires 19 and 20, while the outer ends of the coils 3 and 4 are connected together and to the neutral wire 21 of the three-wire system. This condition of affairs will endure through 90° rotation of the commutator 9, corresponding to 180° on the alternating current wave, and at the end of this time the commutator will serve to reverse the connections, causing the outer ends of the respective coils 3 and 4 to be connected to the positive and negative direct current lines 19 and 20 while the inner or adjacent ends of the coils will be connected to each other, and to the neutral line 21.

While I have shown and described in considerable detail one specific embodiment of my invention, it is to be understood that this showing and description is illustrative only, and for the purpose of making my invention more clear, and that I do not regard the invention as limited to these details nor to any of them, except in so far as I have included such limitations within the terms of the amended claims, in which it is my intention to claim all novelty inherent in my invention as broadly as is permissible in view of the prior arts.

What I claim as new and desire to secure by Letters Patent is:

1. In combination, a transformer primary winding adapted to be connected with a source of alternating current, a pair of secondary windings operatively relating to said primary winding, an Edison three-wire direct current line, a rectifying commutator adapted to be driven in synchronism with the alternating current supplied to the said transformer, insulated commutator segments mounted on said commutator, brushes connected with the said transformer secondary windings and with said Edison three-wire lines, the said brushes and commutator segments being so arranged that connections are maintained between one end of each of said secondary transformer coils and the positive and negative wires respectively of the said Edison lines and between the other ends of said secondary transformer coils and the neutral wire of the said Edison line, during one-half of the alternating current wave, and connections are maintained between said last named ends of said secondary transformer winding, and the positive and negative wires respectively of the Edison line, and between the first named ends of said secondary transformer coil and the neutral wire of the Edison line, during the other half of the alternating current wave.

2. In combination, a primary transformer winding adapted to be connected to a source of alternating current, a pair of secondary windings operatively related to said primary winding, a rectifying commutator adapted to be driven in synchronism with the alternating current supplied to the said transformer, four 90° commutator segments mounted upon the said commutator, eight brushes spaced apart 45° and bearing upon the said commutator, means connecting two diametrically opposite brushes together, and to the neutral wire of an Edison three-wire system, means connecting the two brushes spaced 90° from said last named brushes to the positive and negative wires respectively of the said three-wire system, means connecting the two intermediate brushes on one side of the said neutral brushes to the ends of one of said secondary transformer coils, and means connecting the remaining two intermediate brushes on the other side of said neutral brushes to the ends of the other secondary transformer coil, the arrangement being such that alternating current brushes of like polarity are spaced apart 90°, and brushes of unlike polarity are spaced apart 180°.

HENRY K. SANDELL.